Jan. 5, 1971 YOSHICHI KAWASHIMA 3,553,563
WARNING LAMP RESPONSIVE TO ALTERNATOR OUTPUT FREQUENCY FOR BATTERY CHARGING SYSTEM
Filed Feb. 24, 1969

INVENTOR

Yoshichi Kawashima

BY Cushman, Darby & Cushman

ATTORNEYS

United States Patent Office 3,553,563
Patented Jan. 5, 1971

3,553,563
WARNING LAMP RESPONSIVE TO ALTERNATOR OUTPUT FREQUENCY FOR BATTERY CHARGING SYSTEM
Yoshichi Kawashima, Gifu-shi, Japan, assignor to Nippon Denso Company Limited, Kariya-shi, Japan, a corporation of Japan
Filed Feb. 24, 1969, Ser. No. 801,555
Claims priority, application Japan, Mar. 6, 1968, 43/14,559
Int. Cl. H02j 7/14
U.S. Cl. 320—48
2 Claims

ABSTRACT OF THE DISCLOSURE

A voltage regulator for a storage battery charging means having a three-phase A.C. generator and a three phase full-wave rectifying circuit connected to the output end of the generator, in which resistors are connected to the respective half-wave rectifying ends of the three-phase full-wave rectifying circuit, a field current control transistor circuit for the three-phase A.C. generator is constructed so as to be powered from the resistors, a low-pass filter circuit is connected to the output end of the transistor circuit to detect the oscillation frequency of the transistor circuit, a transistor circuit for flashing a charge indication lamp activated by the output of said filter circuit is connected in parallel with said field current control transistor circuit in association with the field winding of the three-phase A.C. generator, and a charge indication lamp circuit is connected between said transistor circuit for flashing a charge indication lamp and the battery.

BACKGROUND OF THE INVENTION

Field of the invention

The present invention generally relates to a voltage regulator and more specifically relates to a voltage regulator for a storage battery charging means in which three resistors are connected to the respective half-wave rectifying ends of a three-phase full-wave rectifying circuit connected to the output end of a three-phase A.C. generator in order to detect whether said generator generates power or not, a low-pass filter circuit filters an output of a field current control transistor circuit performing a switching operation using the voltage at a common connecting point of the three resistors as a power source and the output of the low-pass filter circuit activates a transistor circuit for flashing a charge indication lamp to flash the charge indication lamp.

Description of the prior art

The conventional voltage regulator for a storage battery charging means is shown in FIG. 1, where a three-phase full-wave rectifying circuit 4 and an auxiliary three-phase full-wave rectifying circuit 4', which includes a part of the three-phase full-wave rectifying circuit 4 and three diodes, 4'a, 4'b and 4'c for flashing a charge indication lamp 20 are connected to the output end of a three-phase A.C. generator 2 driven by an engine (not shown here). And if a key switch 21 for starting the engine is switched on in the case where no current flows through the diodes 4'a, 4'b and 4'c with the three-phase A.C. generator 2 being in an inoperative state, a field current control transistor circuit 9 begins simultaneously to operate in the following manner. That is, as the three-phase A.C. generator 2 is in the inoperative state, the terminal voltage of a storage battery 1 does not reach a value which is enough to conduct a Zener diode detector 12 connected to the base of a terminal voltage detecting transistor 13, and consequently no base current flows through the transistor 13, so that the transistor 13 remains in a cutoff state. On the other hand, a base current from the positive pole of the storage battery 1 flows through a resistor 17 into the base of a field current control transistor 14 so as to make the latter conductive, and then another field current control transistor 15 which is connected in Darlington connection with the transistor 14 becomes also conductive. Consequently, a circuit for flashing the charge indication lamp 20 consisting of the positive pole of the storage battery 1, the starting key switch 21, the charge indication lamp 20, the field current control transistors 14 and 15, and the negative pole of the storage battery 1 is completed and said charge indication lamp 20 flashes to indicate that the three-phase A.C. generator 2 is in a non-generating state. And in this case an initial excitation current flowing through a field winding 3 from the positive pole of the storage battery 1 in the non-generating state is limited to a small value by the resistance of the charge indication lamp 20 which is flashing so that not only an excess exciting current is restricted to flow through said winding 3 but also heat generation at the field current control transistors 14 and 15 is decreased.

But, there is disadvantage in said conventional means that if the diodes 4'a, 4'b and 4'c for flashing charge indication lamp 20 become to be conductive, an exciting current from the output end of the three-phase A.C. generator 2 through the auxiliary three-phase full-wave rectifying circuit 4' flows through the field winding 3 and the dissipation power by said diodes 4'a, 4'b and 4'c is very large.

SUMMARY OF THE INVENTION

One object of the present invention is to provide a voltage regulator for a storage battery charging means having a three-phase A.C. generator and a three-phase full-wave rectifying circuit connected to the output end of the generator, in which resistors are connected at their one ends to the respective half-wave rectifying ends of the three-phase full-wave rectifying circuit, a field current control transistor circuit for the three-phase A.C. generator is so constructed to be powered from the other ends of the resistors, a low-pass filter circuit is connected to the output end of the transistor circuit to detect the oscillation frequency of the transistor circuit, a transistor circuit for flashing a charge indication lamp activated by the output of the filter circuit is connected in parallel with the field current control transistor circuit in association with the field winding of the three-phase A.C. generator, and a charge indication lamp circuit is connected between the transistor circuit for flashing the charge indication lamp and a battery.

Another object of the present invention is to provide a voltage regulator for a storage battery charging means having a three-phase A.C. generator and a three-phase full wave rectifying circuit connected to the output end of the generator, in which resistors are connected at their one ends to the respective half-wave rectifying ends of the three-phase full-wave rectifying circuit, a field current control transistor circuit for the three-phase A.C. generator is so constructed as to be powered from the other ends of the transistor, a low-pass filter circuit is connected to the output end of the transistor circuit to detect the oscillation frequency of the transistor circuit, a transistor circuit for flashing a charge indication lamp activated by the output of the filter circuit is connected in parallel to the field current control transistor circuit in association with the field winding of the three-phase A.C. generator, a charge indication lamp circuit is connected between the transistor circuit for flashing the charge indication lamp and a battery, and further a diode is inserted in the low-pass filter circuit to decrease the discharge time constant with which a condenser in the filter circuit is concerned, and transistors are connected in Darlington connection at the input stage of the transistor circuit for flashing the charge indication lamp.

According to the present invention an excellent effect can be obtained, namely, in the non-generating state of the three-phase A.C. generator, the low-pass filter circuit and the transistor circuit for flashing the charge indication lamp are activated by a current from the storage battery so that the charge indication lamp may be lighted, and without activating the field current control transistor in the field current control circuit an initial excitation current flowing through an initial excitation transistor in the activated transistor circuit for the charge indication lamp and having a small value determined by a load resistor connected to the collector of the transistor flows through the field winding so that heat generation by the field current control transistor can be inhibited.

Further, according to the present invention, another excellent effect can be obtained, namely, even if the three-phase A.C. generator begins to operate there are no disadvantages such as heat generation by a diode forming the rectifying circuit which was experienced in the conventional means in which an activating current is completely provided through the auxiliary rectifying circuit, since in the present invention the activating current is supplied to the field current control transistor circuit through resistors connected to the respective half-wave rectifying ends of the three-phase full-wave rectifying circuit.

Still further, according to the present invention another excellent effect can be obtained, namely, electric charges in the condenser are discharged through said diode quickly, and then the cutoff frequency of the low-pass filter circuit can be lowered and the current gain of the transistors at the input stage of the transistor circuit for flashing the charge indication lamp has a large value because the transistors are in Darlington connection at the input stage. As a result, the capacitance of the condenser in the low-pass filter circuit can be decreased.

BRIEF DESCRIPTION OF THE DRAWINGS

In the drawings like parts or equivalent parts are denoted by the same reference numerals.

DESCRIPTION OF THE PREFERRED EMBODIMENTS

Figure 1:
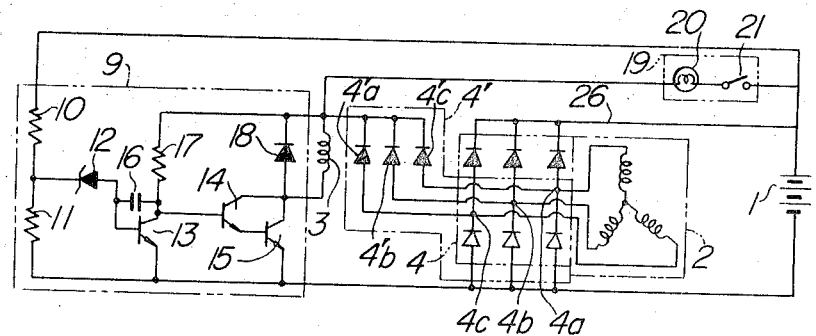
FIG. 1 is an electric wiring diagram of a conventional charging voltage regulator.
Figure 2:
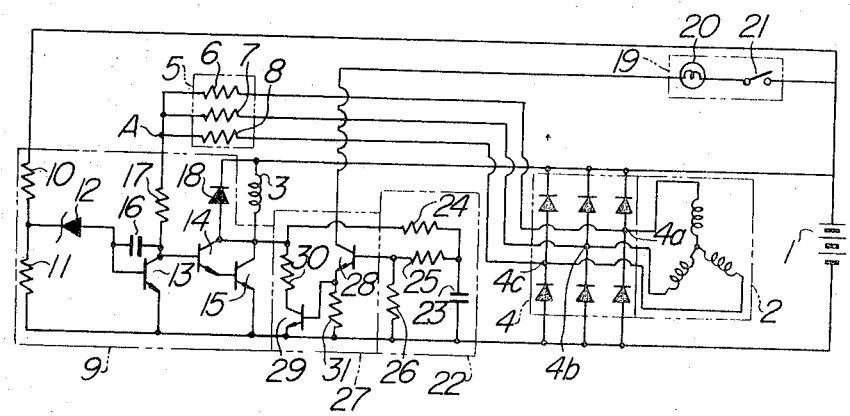
FIG. 2 is an electric wiring diagram of an embodiment of a charging voltage regulator according to the present invention.

At first an embodiment of the invention will be explained referring to FIG. 2. Numeral 1 denotes a storage battery and 2 a three-phase A.C. generator driven by an engine of a vehicle not shown. Numeral 3 denotes a field winding of the generator 2, 4 a three-phase full-wave rectifying circuit connected to the output end of the three-phase A.C. generator 2, and 4a, 4b and 4c half-wave rectifying ends of the rectifying circuit 4. Here, charging means consists of the three-phase A.C. generator 2 and the three-phase full-wave rectifying circuit 4. Numeral 5 denotes a detecting circuit of an output of the generator, and consists of resistors 6, 7 and 8 which are connected to the respective half-wave rectifying ends 4a, 4b and 4c of the three-phase full-wave rectifying circuit 4. Numeral 9 denotes a field current control transistor circuit which is powered from the common end of the resistors 6, 7 and 8 constituting the detecting circuit of the output of the generator 5, 10 and 11 dividing resistors, and 12 a Zener diode detector. Numeral 13 denotes a transistor for detecting the terminal voltage of the storage battery 1, and 14 and 15 transistors for controlling the field current, said transistors 14 and 15 being connected in Darlington connection and performing switching operation together with the transistor 13 for detecting the terminal voltage of the storage battery 1. Numeral 16 denotes a high-frequency by-pass condenser and 17 a resistor which is not only a load resistor of the transistor 13 but also a base resistor of the field current control transistor 14. Numeral 18 denotes a counter electromotive force absorbing diode which absorbs the counter electromotive force generated in the field windings 3. Numeral 19 denotes a charge indication lamp circuit which consists of a charge indication lamp 20 and a key switch 21 for starting the engine. Numeral 22 denotes a low-pass filter circuit including a condenser 23 and resistors 24, 25 and 26. Numeral 27 denotes a transistor circuit for flashing the charge indication lamp 20, 28 a transistor for detecting an output of the filter, 29 an initial excitation transistor, and 30 a load resistor of the transistor 29. A resistor 31 is used as a load resistor of the transistor 28 which constitutes an emitter follower circuit.

Next, the operation of the present invention having the above-mentioned construction will be explained. When the three-phase A.C. generator 2 is in a non-generating or inoperative state, the transistor 13 is in a cutoff state because the activating voltage applied to the collector of the transistor 13 for detecting the terminal voltage of the storage battery 1 at the input stage in the field current control transistor circuit 9 is 0 v. On the other hand, the field current control transistor 14 connected to the next succeeding stage is also in a cutoff state because no base current is supplied with as the three-phase A.C. generator 2 is in a non-generating state, and the field current control transistor 15 which is connected in Darlington connection with the transistor 14 is also in a cutoff state. Consequently, heat generation by the field current control transistors 14 and 15 can be inhibited in the non-generating state of the generator 2. And even if the key switch 21 for starting the engine, which is a driving source of the three-phase A.C. generator 2, is switched off, the transistor 13 for detecting the terminal voltage and the field current control transistors 14 and 15 have no power supply and remain in a cutoff state in the non-generating state of the three-phase A.C. generator 2. On the other hand, the transistor 28 for detecting the output of the filter at the input stage in the charge indication lamp transistor circuit 27 becomes to be conductive because a base current from the positive pole of the storage battery 1 through the field windings 3 and the resistors 24 and 25 in the low-pass filter circuit 22 is applied to the transistor 28. Consequently, a closed loop circuit for flashing said charge indication lamp 20 consisting of the positive pole of the storage battery 1, the key switch 21 for starting the engine, the charge indication lamp 20, the collector of the transistor 28 for detecting the output of the filter 22, the emitter of the transistor 28 and the negative pole of the storage battery 1 is completed and the lamp 20 is lighted to indicate that the three-phase A.C. generator 2 is in its non-generating state. An at the same time when the transistor 28 for detecting the output of the filter 22 is conductive, the initial excitation transistor 29 connected to the transistor 28 in the next succeeding stage becomes conductive. Then the initial excitation current of such a small value as is determined by the load resistor 30 of the transistor 29 flows from the positive pole of the storage battery 1 into the field winding 3. When the three-phase A.C. generator 2 begins to operate, a positive voltage with less ripple than that of a voltage at the neutral point of the three-phase A.C. generator 2 is generated at the common connecting point A of the resistors 6, 7 and 8 in the circuit for detecting the output 5 of the generator, and the voltage at the point A becomes an operating collector voltage for the transistor 13 in the field current control transistor circuit 9, and thereafter the terminal voltage of the storage battery 1 is detected with the dividing resistors 10 and 11 and the Zener diode detector 12, the exciting current of the field windings 3 being interrupted by the switching operation of the transistor 13 for detecting the terminal voltage and the field current control transistors 14 and 15 to control the output voltage of the three-phase A.C. generator 2, that is the terminal voltage of the storage battery 1 to remain at a predetermined value. By that, the collector voltage of said field current control transistors 14 and 15 start to alternately become "on" and "off" at a certain frequency. And in this case the cutoff frequency of the low-pass filter circuit 22 is set below 50 c./s., so if the resulting pulsating frequency of the collector voltage of the transistors 14 and 15 becomes higher than 50 c./s., no input signal is applied to the transistor 28 for detecting the output of the filter 22 by the operation of the low-pass filter circuit 22 so that the base voltage of the transistor 28 drops suddenly, which renders the transistor to be in the cutoff state. At the same time, the initial excitation transistor 29 is also made to be in the cutoff state, the initial excitation current flowing through the load transistor 30 and the resistor 29 is cut off and useless heat generation of said load resistor by said current is inhibited.

Figure 3:
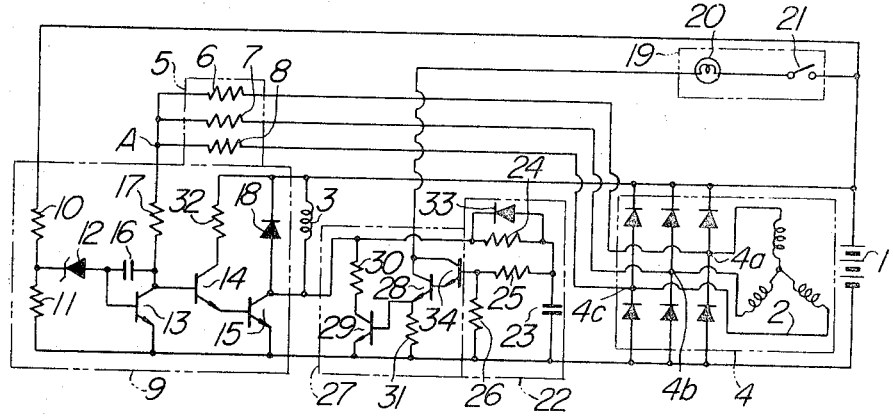
FIG. 3 is an electric wiring diagram of another embodiment of a charging voltage regulator according to the present invention.

Next, another embodiment will be explained referring to FIG. 3. In FIG. 3, 1–31 denote like or equivalent parts used in the embodiment mentioned above, and 32 a load resistor which is connected to the collector of the field current control transistor 14 in the field current control transistor circuit 9 and is intended to act as a sort of emitter follower. Numeral 33 denotes a diode which is inserted in the low-pass filter circuit 22 to decrease the discharge time constant of the condenser 23 in the circuit 22. Numeral 34 denotes a transistor which is in Darlington connection with the transistor 28 for detecting the output of the filter in the transistor circuit for flashing the charge indication lamp.

Only those points of the operation of the means with this construction which are different from those of the means mentioned formerly will be explained hereunder. Electric charges stored in the condenser 23 can be discharged through the two transistors 14 and 15 and the diode 33 quickly while the field current control transistors 14 and 15 are conductive, because the diode 33 is connected in parallel connection with the resistor 24, which which makes the time constant of the condenser 23 and the resistor 24 at discharging to be a small value apparently to lower the charge voltage of said condenser 23 and the cutoff frequency of the low-pass filter circuit 22, and consequently a small value of capacitance can be used for the condenser 23. And moreover, the current amplification factor of the combination of the transistors 28 and 34 has a large value because the transistor 28 for detecting the output of the filter 22 and the transistor 34 in the charge indication lamp transistor circuit 27 are connected in Darlington connection, then the value of the capacitance of said condenser 23 can be lowered. As the load resistor 32 is connected to the collector of the field current control transistor 14, the resistor 32 has heat generation at the field current control transistors 14 and 15 can be lowered thereby.

What is claimed is:

1. A voltage regulator for a storage battery charging means wherein resistors are connected at their one ends with respective half-wave rectifying ends of a three-phase full-wave rectifying circuit; a field current control transistor circuit for said three-phase A.C. generator is so constructed as to be powered from the other ends of said resistors; a low-pass filter circuit is connected to the output end of said transistor circuit to detect the oscillation frequency of said transistor circuit; a transistor circuit for flashing a charge indication lamp activated by the output of said filter circuit is connected in parallel to said field current control transistor circuit in association with the field winding of said three-phase A.C. generator; and a charge indication lamp circuit is connected between said transistor circuit for flashing the charge in indication lamp and the battery.

2. A voltage regulator for a storage battery charging means according to claim 1, wherein a diode is inserted in said low-pass filter circuit to lower the discharge time constant with which a condenser in said filter circuit is concerned and transistors are connected in Darlington connection at the input stage in said transistor circuit for flashing the charge indication lamp.

References Cited

UNITED STATES PATENTS

| 3,209,234 | 9/1965 | Bridgeman et al. | 322—73 |
| 3,417,310 | 12/1968 | Hill | 322—99 |
| 3,479,575 | 11/1969 | Wright et al. | 320—48 |

WILLIAM M. SHOOP, Jr., Primary Examiner

J. M. GUNTHER, Assistant Primary

U.S. Cl. X.R.

320—61; 322—28, 73, 99